(12) United States Patent
Toda

(10) Patent No.: US 11,916,344 B2
(45) Date of Patent: Feb. 27, 2024

(54) CABLE ASSEMBLY

(71) Applicant: JAPAN AVIATION ELECTRONICS INDUSTRY, LIMITED, Tokyo (JP)

(72) Inventor: Kentaro Toda, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/584,206

(22) Filed: Jan. 25, 2022

(65) Prior Publication Data

US 2022/0263253 A1 Aug. 18, 2022

(30) Foreign Application Priority Data

Feb. 16, 2021 (JP) .................................. 2021-022572

(51) Int. Cl.
*H01R 4/02* (2006.01)
*H01B 7/02* (2006.01)
*H01R 43/24* (2006.01)
*H01R 4/60* (2006.01)

(52) U.S. Cl.
CPC .................. *H01R 4/02* (2013.01); *H01B 7/02* (2013.01); *H01R 4/60* (2013.01); *H01R 43/24* (2013.01)

(58) Field of Classification Search
CPC .. H01R 43/24; H01R 13/506; H01R 2201/26; H01R 13/6658
See application file for complete search history.

(56) References Cited

U.S. PATENT DOCUMENTS

| 5,478,008 A | 12/1995 | Takahashi | |
|---|---|---|---|
| 6,896,533 B2 * | 5/2005 | Schubert | H01H 3/141 307/119 |
| 7,534,143 B1 * | 5/2009 | Tsao | H01R 13/58 439/607.41 |
| 8,721,361 B2 * | 5/2014 | Wu | H01R 13/405 439/607.49 |
| 9,379,460 B2 | 6/2016 | Miyamoto et al. | |
| 10,122,097 B2 | 11/2018 | Kim et al. | |

(Continued)

FOREIGN PATENT DOCUMENTS

| CN | 104335423 A | 2/2015 |
|---|---|---|
| CN | 107431308 A | 12/2017 |

(Continued)

OTHER PUBLICATIONS

Chinese Office Action (and an English language translation thereof) dated Nov. 29, 2023, issued in counterpart Chinese Application No. 202210019020.8.

*Primary Examiner* — Truc T Nguyen
(74) *Attorney, Agent, or Firm* — Holtz, Holtz & Volek PC

(57) ABSTRACT

A cable assembly comprises a cable, a holding member and a contact. The holding member holds the cable. The contact is located above the holding member in an upper-lower direction. The cable comprises a conductive wire. The conductive wire has a fixed portion. The holding member has a predetermined surface. The contact has a facing surface. The facing surface is in contact with the predetermined surface in the upper-lower direction or faces the predetermined surface with a distance formed therebetween in the upper-lower direction. The fixed portion is fixed and connected to the predetermined surface.

8 Claims, 8 Drawing Sheets

(56) References Cited

U.S. PATENT DOCUMENTS

| | | | | |
|---|---|---|---|---|
| 2006/0141867 A1* | 6/2006 | Liu | ..................... | H01R 13/506 |
| | | | | 439/660 |
| 2012/0264337 A1* | 10/2012 | Gross | ............... | B29C 45/14639 |
| | | | | 439/660 |
| 2013/0210288 A1* | 8/2013 | Schumacher | ...... | H01R 13/6469 |
| | | | | 29/829 |
| 2020/0014138 A1* | 1/2020 | Takeuchi | ............. | H01R 13/629 |
| 2022/0149566 A1* | 5/2022 | Mostoller | .......... | H01R 13/5213 |
| 2023/0154650 A1 | 5/2023 | Wang | | |

FOREIGN PATENT DOCUMENTS

| | | |
|---|---|---|
| CN | 111478060 A | 7/2020 |
| JP | H06275325 A | 9/1994 |
| JP | 2002025651 A | 1/2002 |
| JP | 2010225529 A | 10/2010 |
| JP | 2016225051 A | 12/2016 |

\* cited by examiner

CABLE ASSEMBLY

CROSS REFERENCE TO RELATED APPLICATIONS

This application is based on and claims priority under 35 U.S.C. § 119 to Japanese Patent Application No. JP 2021-022572 filed Feb. 16, 2021, the content of which is incorporated herein in its entirety by reference.

BACKGROUND OF THE INVENTION

This invention relates to a cable assembly comprising a cable and a contact connected to the cable.

For example, this type of cable assembly is disclosed in JPH06-275325A (Patent Document 1), the content of which is incorporated herein by reference.

Referring to FIGS. 15 and 16, Patent Document 1 discloses a cable assembly 90 comprising a terminal (contact) and a litz wire (cable) 94. The cable 94 is formed of fine conductive wires which are coated with insulator and twisted together. The cable 94 has an end which is obliquely cut so that a cut surface 96 is formed. The cut surface 96 of each of the conductive wires is exposed outward from the cable 94. The contact 92 is connected to the conductive wires of the cable 94 via a thick solder wax 98 which covers the cut surfaces 96.

The cable assembly of Patent document 1 has conductive properties such as impedance which will vary depending on amount of the solder wax. For example, high-frequency transmission properties might vary.

SUMMARY OF THE INVENTION

It is therefore an object of the present invention to provide a cable assembly which can reduce variation in conductive properties.

An aspect of the present invention provides a cable assembly comprising a cable, a holding member and a contact. The holding member holds the cable. The contact is located above the holding member in an upper-lower direction. The cable comprises a conductive wire. The conductive wire has a fixed portion. The holding member has a predetermined surface. The contact has a facing surface. The facing surface is in contact with the predetermined surface in the upper-lower direction or faces the predetermined surface with a distance formed therebetween in the upper-lower direction. The fixed portion is fixed and connected to the facing surface.

According to the cable assembly of an aspect of the present invention, the fixed portion of the conductive wire, which is held by the holding member, is fixed and connected to the facing surface of the contact which is in contact with or faces the predetermined surface of the holding member. For example, the fixed portion can be directly connected to the facing surface via soldering or welding such as resistance welding and via no member which might substantially affect conductive properties. Thus, an aspect of the present invention provides the cable assembly which can reduce variation in conductive properties.

Figure 1:
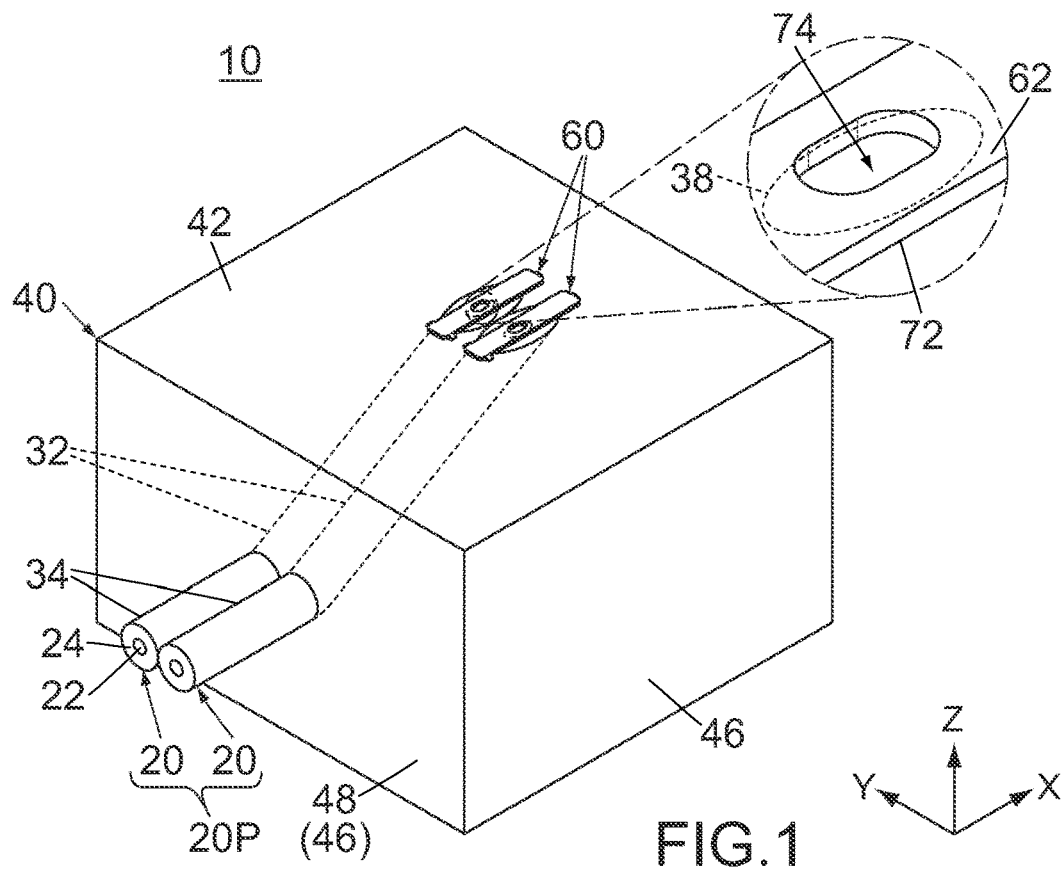
FIG. 1 is a perspective view showing a cable assembly according to an embodiment of the present invention, wherein outlines of held portions of cables embedded in a holding member are illustrated with dashed line, a part of the cable assembly enclosed by chain dotted lines is enlarged and illustrated, and in the enlarged view, an outline of a hidden fixed portion of the cable is illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
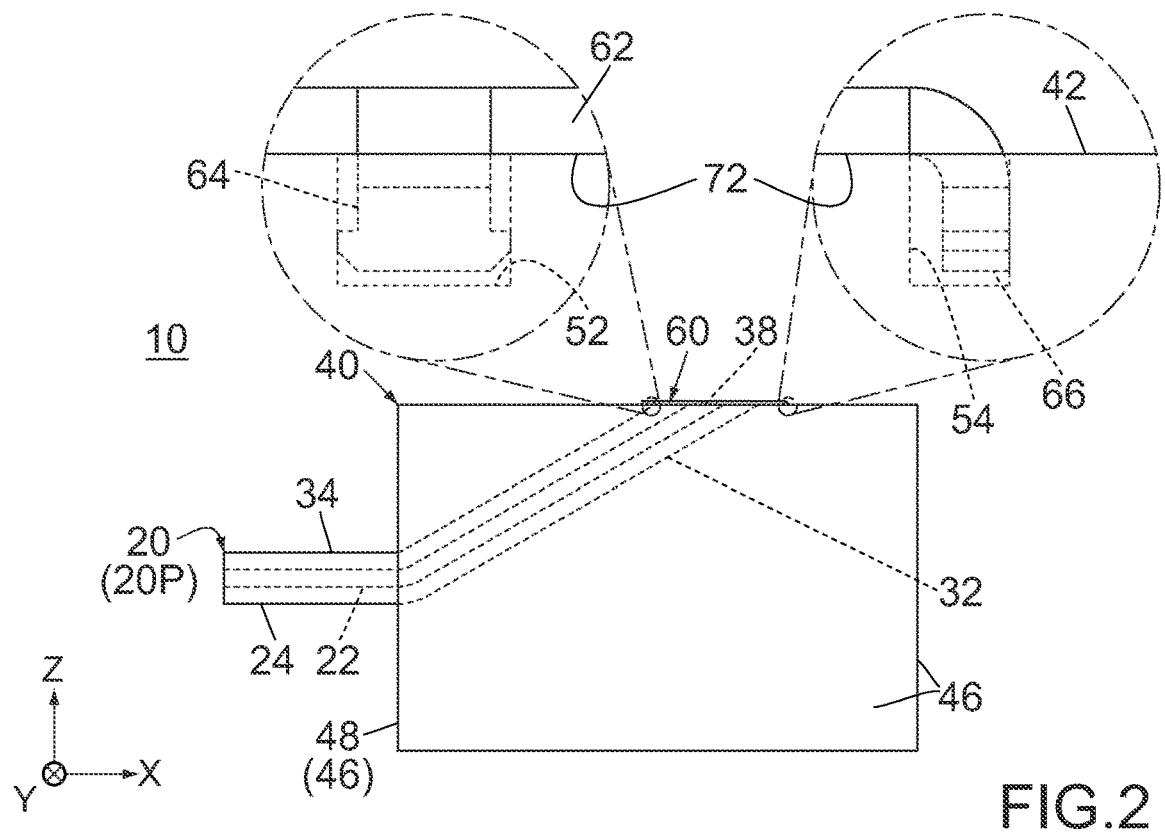
FIG. 2 is a side view showing the cable assembly of FIG. 1, wherein an outline of the held portion of the cable embedded in the holding member and an outline of a hidden conductive wire of the cable are illustrated with dashed line, two parts of the cable assembly each enclosed by chain dotted lines are enlarged and illustrated, and in each of the enlarged views, an outline of a hidden press-fit hole of the holding member and an outline of a hidden press-fit portion of a contact which is press-fit in the press-fit hole are illustrated with dashed line.

Referring to FIGS. 1 and 2, a cable assembly 10 according to an embodiment of the present invention comprises two cables 20, a holding member 40 made of insulator and two contact 60 each made of conductor. The contacts 60 are mounted on the holding member 40 and are connected to the cables 20, respectively. The cable assembly 10 of the present embodiment comprises only the aforementioned members. However, the present invention is not limited thereto. For example, the cable assembly 10 may further comprise another member in addition to the aforementioned members.

The cable assembly 10 of the present embodiment can be used as various components. For example, the cable assembly 10 can be used as a relay component for connecting the cables 20 to mating contacts (not shown) of a mating connector (not show), respectively, as described later. When the cable assembly 10 is used as the forementioned relay component, the cable assembly 10 may comprise a cover which accommodates the mating connector.

Hereafter, explanation will be made about the cable assembly 10 of the present embodiment.

Referring to FIG. 1, the cable assembly 10 of the present embodiment comprises only two of the cables 20. The two cables 20 of the present embodiment work as one cable pair 20P for transmitting differential signals. However, the present invention is not limited thereto. For example, the two cables 20 may transmit signals independent from each other. The cable assembly 10 may comprise only one of the cables 20 or may comprise three or more of the cables 20 which transmit signals independent from each other. Moreover, the cable assembly 10 may comprise two or more of the cable pairs 20P.

The two cables 20 of the present embodiment have structures same as each other. More specifically, each of the cables 20 comprises a cover 24 made of insulator and a conductive wire 22 made of metal such as copper which has high conductivity. Each of the covers 24 covers the conductive wire 22. However, the present invention is not limited thereto. For example, each of the cables 20 may comprise only the conductive wire 22. Each of the conductive wires 22 may be a single metal wire or may be formed of a plurality of fine metal wires twisted together. Each of the cables 20 may comprise a shield in addition to the conductive wire 22 and the cover 24. The shield may cover the cover 24. Moreover, the two cables 20 may have structures different from each other.

Referring to FIGS. 1 and 2, the holding member 40 holds the cables 20. The holding member 40 of the present embodiment is made of resin. More specifically, resin is molded into the holding member 40. Each of the cables 20 is insert-molded in the holding member 40. According to the present embodiment, the cables 20 are securely held by the holding member 40 and are reliably positioned relative to the holding member 40. However, the present invention is not limited thereto. For example, the holding member 40 may be formed of two members which are formed separately from each other and thereafter combined to each other. In this instance, the two cables 20 may be sandwiched and held between the two members to be positioned. In other words, the holding member 40 may be a positioning member which comprises the two members.

Each of the cables 20, which is held by the holding member 40 as described above, has a held portion 32 and an extending portion 34. Each of the held portions 32 is a part of the cable 20 which is held by the holding member 40. Each of the extending portions 34 is another part of the cable 20 which is located outside the holding member 40. Each of the held portions 32 of the present embodiment is entirely embedded in the holding member 40.

The holding member 40 of the present embodiment insulates the two held portions 32 from each other. Therefore, even in an instance where each of the cables 20 comprises only the conductive wire 22, the held portions 32 can be held while the two conductive wires 22 are not short-circuited to each other. However, the present invention is not limited thereto. For example, when the number of the cables 20 is one, the holding member 40 may be made of conductor such as metal.

The holding member 40 of the present embodiment has a rectangular parallelepiped shape as a whole. The holding member 40 has one predetermined surface (upper end surface) 42 and four side surfaces 46.

The predetermined surface 42 of the present embodiment defines an upper end of the holding member 40 in an upper-lower direction. The upper-lower direction of the present embodiment is the Z-direction. "Upward" of the present embodiment means the positive Z-direction. "Downward" of the present embodiment means the negative Z-direction. The predetermined surface 42 of the present embodiment is a flat surface which extends along a horizontal plane (XY-plane) perpendicular to the upper-lower direction. However, the present invention is not limited thereto. For example, the predetermined surface 42 may be a flat surface oblique to the upper-lower direction or may be a curved surface which extends along the horizontal plane as a whole.

Two of the four side surfaces 46, namely the first side surfaces 46, are located at opposite sides of the holding member 40, respectively, in a lateral direction perpendicular to the upper-lower direction. The lateral direction of the present embodiment is the Y-direction. The two first side surfaces 46 extend in parallel to each other along a first vertical plane (XZ-plane) perpendicular to the lateral direction. The other two of the four side surfaces 46, namely the second side surfaces 46, are located at opposite sides of the holding member 40, respectively, in a front-rear direction perpendicular to both the upper-lower direction and the lateral direction. The front-rear direction of the present embodiment is the X-direction. "Forward" of the present embodiment means the positive X-direction. "Rearward" of the present embodiment means the negative X-direction. The two second side surfaces 46 extend in parallel to each other along a second vertical plane (YZ-plane) perpendicular to the front-rear direction.

The holding member 40 of the present embodiment has one predetermined side surface 48. The predetermined side surface 48 of the present embodiment is one of the side surfaces 46 and a rear surface of the holding member 40. The held portion 32 of each of the cables 20 linearly extends from the predetermined side surface 48 to the predetermined surface 42 along a predetermined direction oblique to the upper-lower direction. The extending portion 34 of each of the cables 20 is arranged outside the holding member 40 and extends rearward from the predetermined side surface 48 to be connected to an electronic device (not shown).

Referring to FIG. 1, the held portion 32 of each of the cables 20 is exposed from the predetermined surface 42 of the holding member 40 and is formed with a fixed portion 38. Each of the fixed portions 38 of the present embodiment is an edge surface of the conductive wire 22. Thus, each of the conductive wires 22 has the fixed portion 38. Each of the fixed portions 38 of the present embodiment is a flat surface in parallel to the horizontal plane. However, the present invention is not limited thereto. For example, each of the fixed portions 38 may be a flat surface slightly oblique to the horizontal plane.

The two cables 20 of the present embodiment are arranged in the lateral direction. The two held portions 32 are held similarly to each other by the holding member 40.

The two extending portions 34 extend similarly to each other. The two fixed portions 38 have shapes same as each other and are arranged in the lateral direction. Moreover, the two contacts 60 are provided so as to correspond to the fixed portions 38, respectively, and are arranged in the lateral direction. The two contacts 60 have structures same as each other. Thus, the cable assembly 10 of the present embodiment comprises two sets each consisting of one of the contacts 60 and one of the fixed portions 38. The two sets have structures same as each other and are arranged in the lateral direction with a slight distance formed therebetween.

Each of the contacts 60 of the present embodiment is an independent connection member. However, the present invention is not limited thereto. For example, each of the contacts 60 may be a part of a connector (not shown) which is formed of various members. In this instance, each of the contacts 60 may be held by a housing (not shown) of the connector.

The holding member 40 of the present embodiment has a rectangular parallelepiped shape which is vertically thick. However, the present invention is not limited thereto. The shape of the holding member 40 is not specifically limited, provided that the holding member 40 has the predetermined surface 42. For example, the holding member 40 may have a flat-plate shape which is vertically thin. The thus-shaped holding member 40 may hold a large number of the cables 20 which are connected to the contacts 60, respectively. The cable assembly 10, which comprises the holding member 40 having such a flat-plate shape, may be used as a relay component for connecting the cables 20 to a connector (not shown) such as a high-definition multimedia interface (HDMI) connector and a universal serial bus (USB) Type-C connector. The cable assembly 10, which is a relay component, may be fixed to the connector to form a harness.

Hereafter, explanation will be made about one of the sets of the present embodiment, each of which consists of one of the contacts 60 and the corresponding fixed portion 38. The explanation described below is applicable to each set.

Referring to FIGS. 3 to 6, the contact 60 of the present embodiment is made of a single metal plate. In detail, the contact 60 is formed by bending a single metal plate. Thus, the contact 60 is a single metal plate with bends. The contact 60 of the present embodiment has a body 62, a facing surface 72, two press-fit portions 64 and one press-fit portion 66. The contact 60 of the present embodiment is formed with a passing hole 74.

The body 62 of the present embodiment has a flat-plate shape which extends along the horizontal plane. The body 62 has a rectangular shape in the horizontal plane and extends long in the front-rear direction. However, the present invention is not limited thereto, but the shape of the body 62 is not specifically limited.

Figure 3:
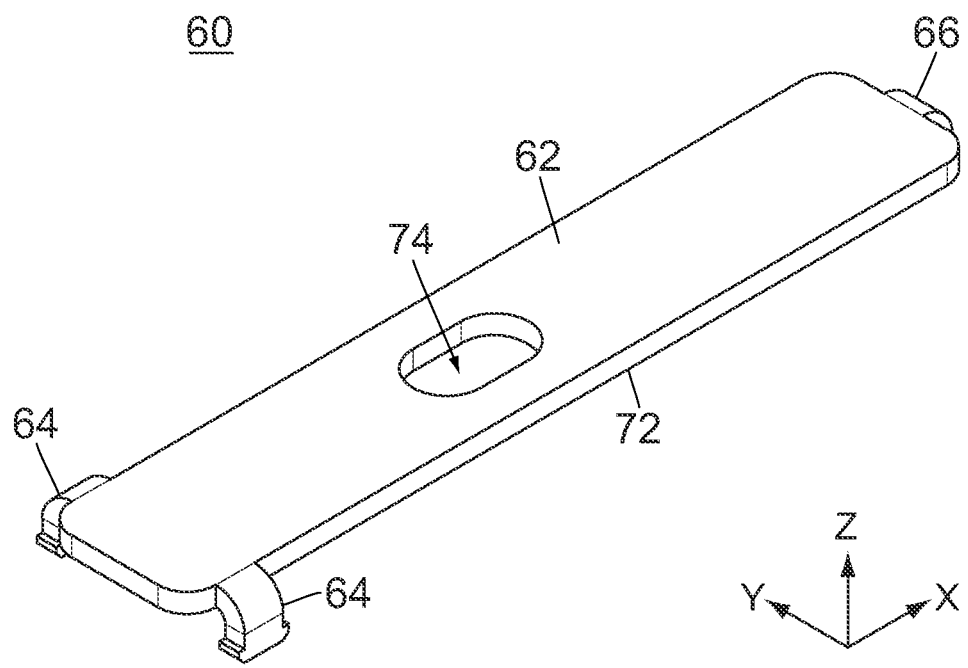
FIG. 3 is a perspective view showing the contact of the cable assembly of FIG. 1.
Figure 4:
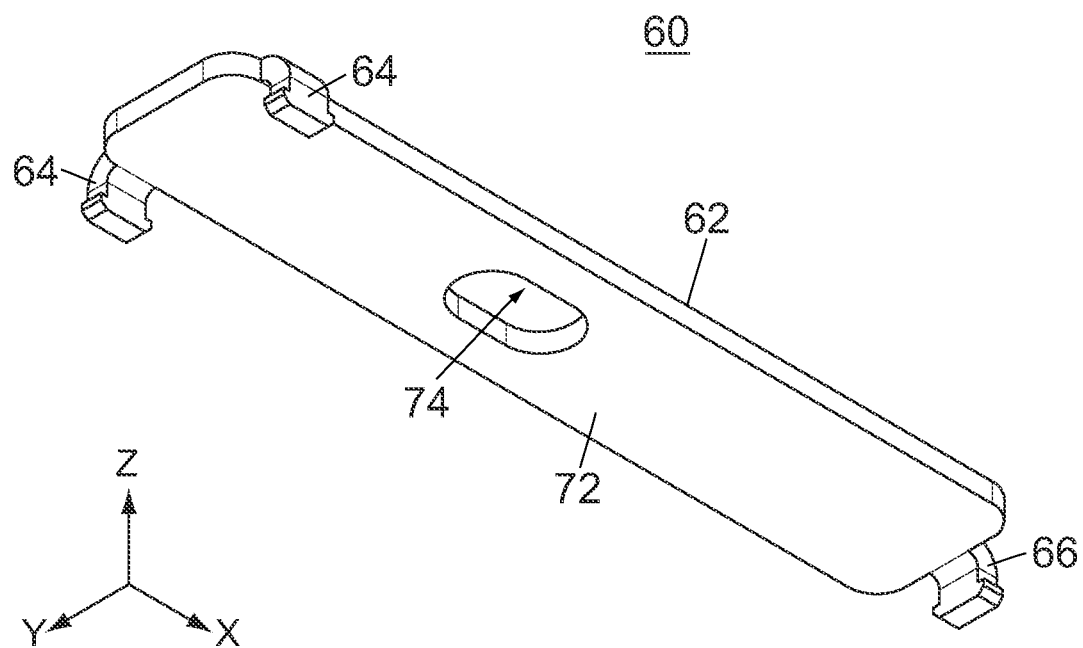
FIG. 4 is another perspective view showing the contact of FIG. 3.
Figure 5:
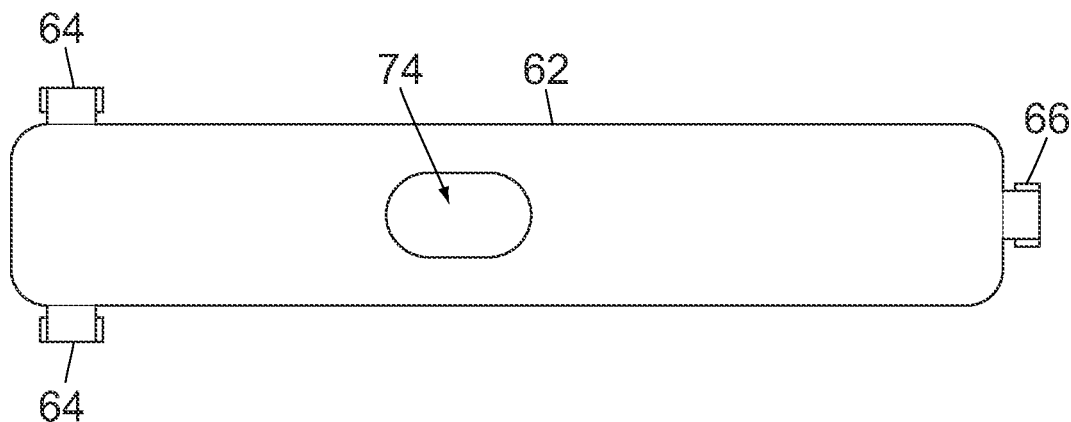
FIG. 5 is a top view showing the contact of FIG. 3.
Figure 6:
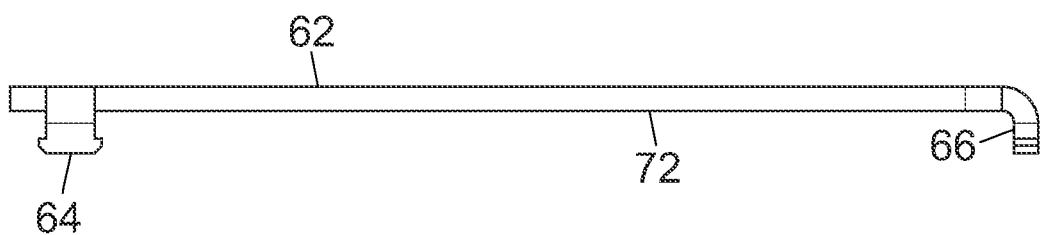
FIG. 6 is a side view showing the contact of FIG. 3.

Referring to FIGS. 3, 4 and 6, the facing surface 72 is a lower surface of the body 62. The facing surface 72 of the present embodiment is a flat surface which extends along the horizontal plane. However, the present invention is not limited thereto. For example, the facing surface 72 may be uneven. Referring to FIGS. 3 to 5, the passing hole 74 is formed in the body 62. The passing hole 74 is a hole which passes through the body 62 in the upper-lower direction. Thus, the passing hole 74 passes through the facing surface 72 in the upper-lower direction.

Referring to FIGS. 3 to 6, each of the press-fit portions 64 is located in the vicinity of a rear end of the body 62. The two press-fit portions 64 are located at opposite sides of the body 62 in the lateral direction, respectively. Each of the press-fit portions 64 protrudes outward in the lateral direction from the body 62 and thereafter extends downward. Each of the press-fit portions 64 is provided with press-fit projections which are located in the vicinity of a lower end thereof. On the other hand, the press-fit portion 66 is located at a front end of the body 62. The press-fit portion 66 protrudes forward from the body 62 and thereafter extends downward. The press-fit portion 66 is provided with press-fit projections which are located in the vicinity of a lower end thereof.

As shown in FIGS. 1 and 2, the contact 60 is located above the holding member 40 in the upper-lower direction. The contact 60 of the present embodiment is fixed to the holding member 40. In detail, referring to FIGS. 7 and 8, the holding member 40 is formed with two press-fit holes 52 and one press-fit hole 54 for each of the contacts 60. Thus, the holding member 40 is formed with four of the press-fit holes 52 and two of the press-fit holes 54. Referring to FIG. 2, the press-fit portions 64 of the contact 60 are press-fit into the press-fit holes 52, respectively, and the press-fit portion 66 of the contact 60 is press-fit into the press-fit hole 54.

As described above, the contact 60 of the present embodiment is partially press-fit into and fixed to the holding member 40. However, the present invention is not limited thereto. For example, the contact 60 may be fixed to the holding member 40 by using a screw (not shown) or adhesive (not shown).

The facing surface 72 of the contact 60, which is fixed to the holding member 40, faces the predetermined surface 42 of the holding member 40 in the upper-lower direction. The facing surface 72 of the present embodiment faces the predetermined surface 42 with no distance left therebetween in the upper-lower direction. In other words, the facing surface 72 is in contact with the predetermined surface 42 in the upper-lower direction. However, the present invention is not limited thereto. For example, the facing surface 72 may face the predetermined surface 42 with a distance formed therebetween in the upper-lower direction. Thus, the facing surface 72 should be in contact with the predetermined surface 42 in the upper-lower direction or should face the predetermined surface 42 with a distance formed therebetween in the upper-lower direction.

Referring to FIG. 1, the fixed portion 38 of the conductive wire 22 is fixed and connected to the facing surface 72 of the contact 60. In detail, the contact 60 of the present embodiment is arranged on the predetermined surface 42 of the holding member 40 so that the passing hole 74 is located just over the fixed portion 38. Thus, a position of the fixed portion 38 of the conductive wire 22 in the horizontal plane is equal to or overlaps with another position of the passing hole 74 in the horizontal plane. The thus-arranged passing hole 74 is filled with solder (not shown) pot thereinto. The fixed portion 38 of the present embodiment is fixed and connected to the facing surface 72 by the solder which is poured so as to fill the passing hole 74. When the cable assembly 10 is seen from above along the upper-lower direction, the solder (not shown) which covers the fixed portion 38 is visible.

As described above, the fixed portion 38 of the present embodiment is soldered to the facing surface 72. However, the present invention is not limited thereto, but a method of fixing the fixed portion 38 to the facing surface 72 is not specifically limited. For example, the fixed portion 38 may be fixed and connected to the facing surface 72 via welding such as electric resistance welding or laser beam welding. In this instance, the contact 60 does not need to be formed with the passing hole 74.

Figure 13:
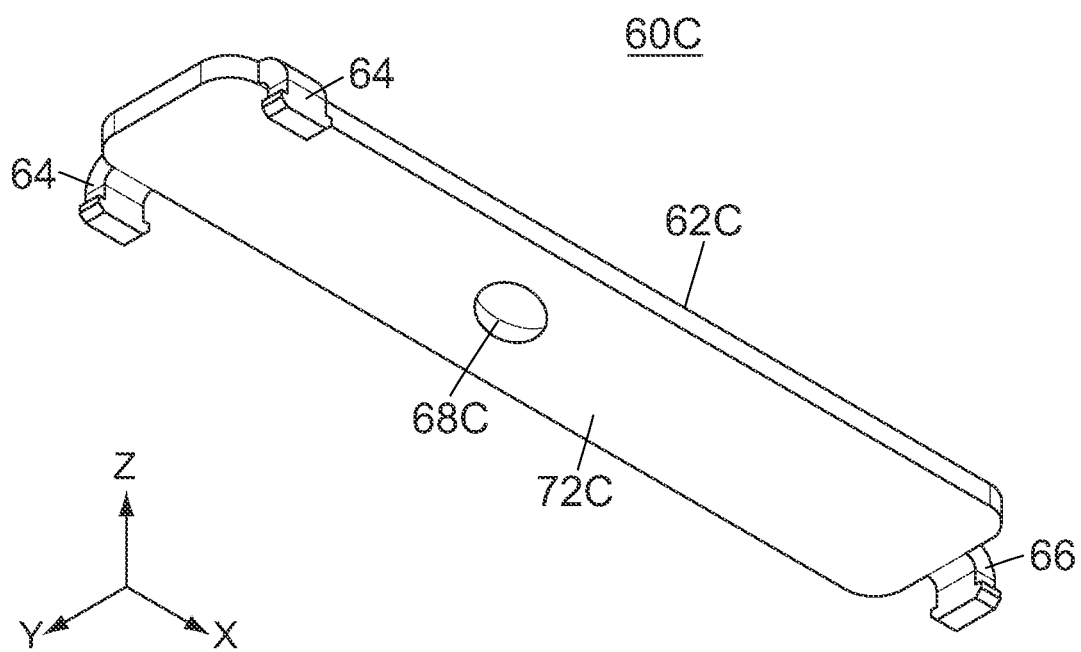
FIG. 13 is a perspective view showing a modification of the contact of FIG. 3.
Figure 14:
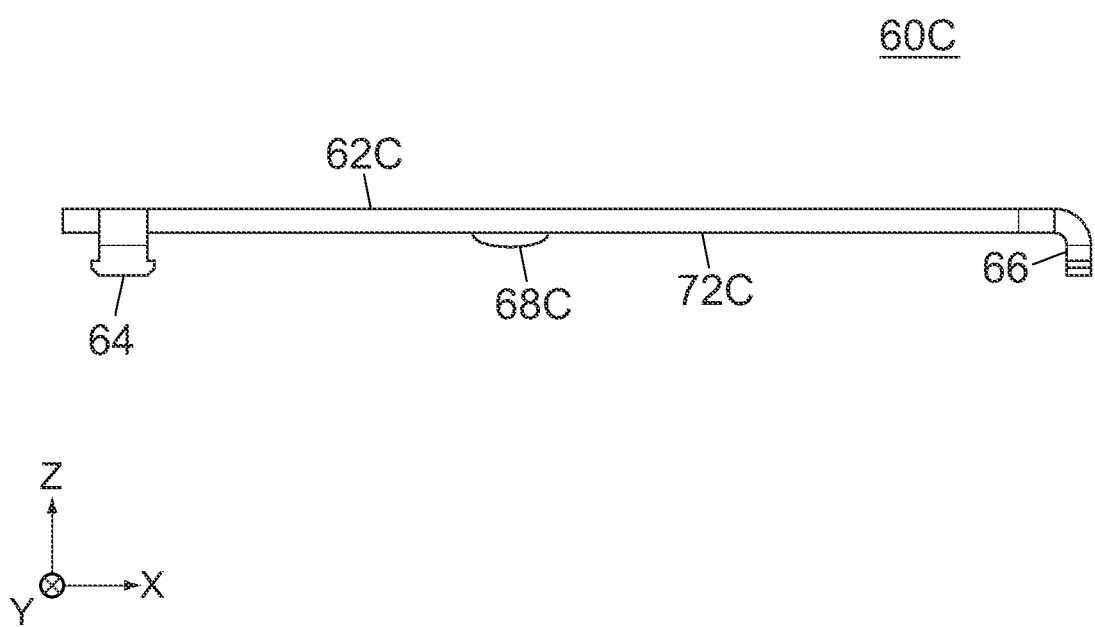
FIG. 14 is a side view showing the contact of FIG. 13.
Figure 15:
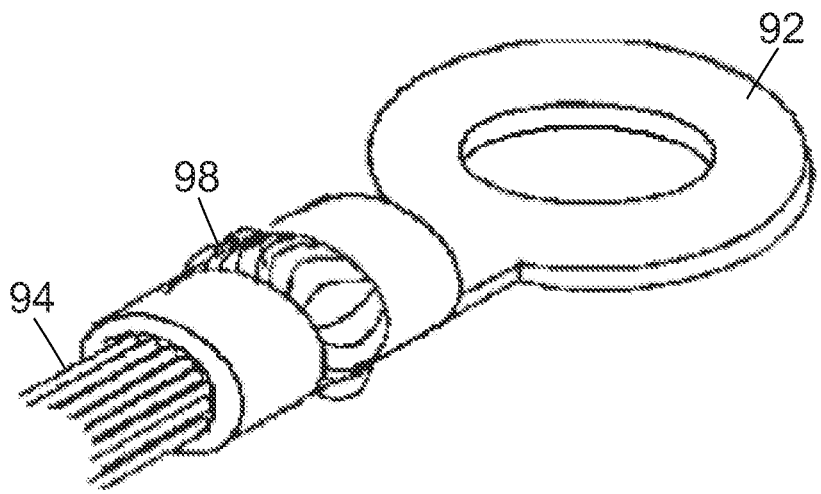
FIG. 15 is a perspective view showing a cable assembly of Patent Document 1.
Figure 16:
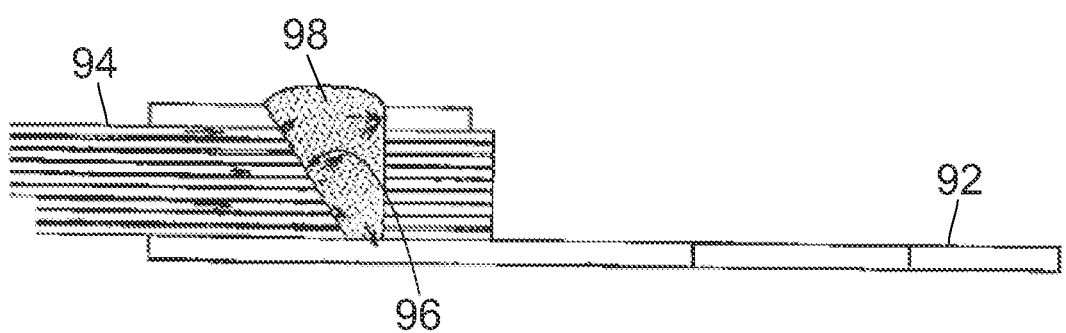
FIG. 16 is a cross-sectional view showing the cable assembly of FIG. 15.

More specifically, the cable assembly 10 may comprise a contact 60C illustrated in FIGS. 13 and 14 instead of the contact 60. Comparing FIGS. 13 and 14 with FIG. 4, the contact 60C has a body 62C different from the body 62 of the contact 60. The body 62C has a projection 68C instead of the passing hole 74. Thus, the contact 60C has a facing surface 72C formed with no hole and is provided with the projection 68C. The projection 68C projects downward from the facing surface 72C. The contact 60C has a structure same as that of the contact 60 except for the aforementioned differences.

Referring to FIG. 1 together with FIG. 13, when the cable assembly 10 is provided with the contact 60C instead of the contact 60, the projection 68C is pressed against and welded to the fixed portion 38 of the conductive wire 22 via electric resistance welding. Thus, in an instance where the cable assembly 10 is provided with the contact 60C, the fixed portion 38 of the conductive wire 22 is welded to the projection 68C after the contact 60C is fixed to the holding member 40.

Summarizing the explanation described above, according to the cable assembly 10 of the present embodiment, the fixed portion 38 of the conductive wire 22, which is held by the holding member 40, is fixed and connected to the facing surface 72 of the contact 60 which is in contact with or faces the predetermined surface 42 of the holding member 40. The fixed portion 38 can be directly connected to the facing surface 72 via soldering or welding such as electric resistance welding and via no member which might substantially affect conductive properties. Thus, the present embodiment provides the cable assembly 10 which can reduce variation in conductive properties.

Referring to FIG. 2, the contact 60 of the present embodiment is fixed to the fixed portion 38 of the conductive wire 22 after being fixed to the holding member 40 to be securely positioned relative to the fixed portion 38. However, the present invention is not limited thereto. For example, the contact 60 may be fixed to the fixed portion 38 without being fixed to the holding member 40.

Referring to FIG. 1, the contact 60 which is fixed to the holding member 40 can be brought into contact with the mating contact (not shown) of the mating connector (not shown). For example, the mating contact may be pressed against the contact 60 from above. Instead, the mating contact having a spring portion may be moved along the predetermined surface 42 to be brought into contact with an upper surface of the contact 60.

The contact 60 may be a so-called socket. More specifically, the contact 60 may have a receiving portion which can receive and can be brought into contact with the mating contact (not shown) in addition to the facing surface 72 which is configured to be fixed to the fixed portion 38 of the conductive wire 22.

The conductive wire 22 of the cable 20 may be an aluminum wire. In general, an aluminum wire is easily eroded because of water droplets attached thereto when exposed to the atmosphere. In contrast, the conductive wire 22 of the present embodiment is not exposed outward except for the fixed portion 38. In addition, the fixed portion 38 is substantially entirely covered by the contact 60 and the solder (not shown). According to the present embodiment, the erosion due to attachment of water droplets can be prevented.

Figure 7:
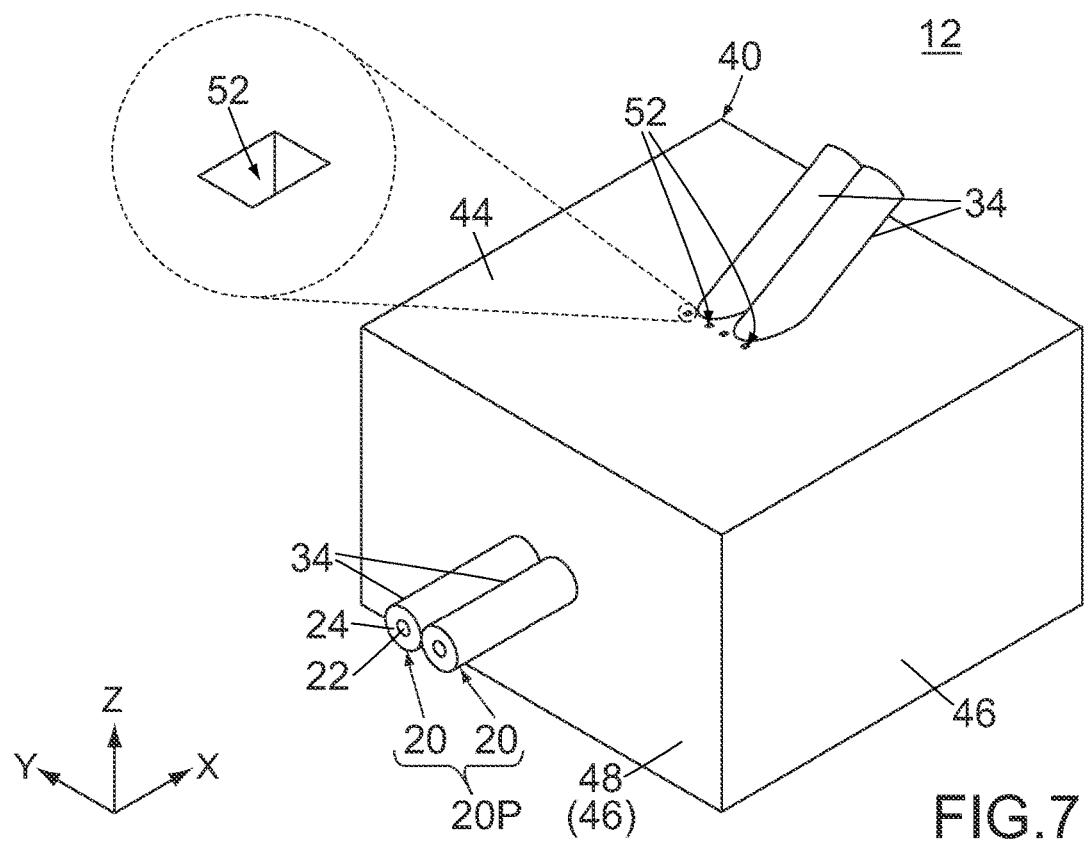
FIG. 7 is a perspective view showing a first intermediate assembly in a forming process of the cable assembly of FIG. 1, wherein a part of the first intermediate assembly enclosed by dashed line is enlarged and illustrated.
Figure 8:
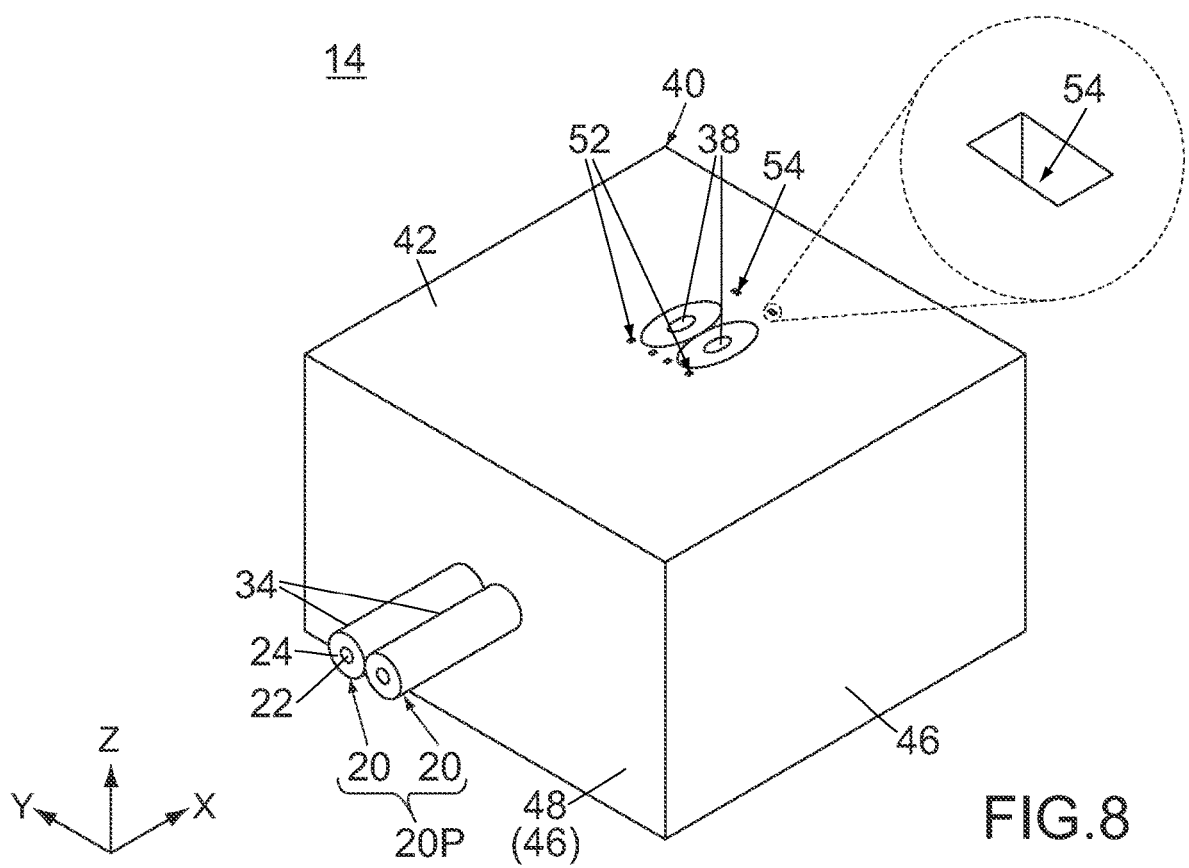
FIG. 8 is a perspective view showing a second intermediate assembly in the forming process of the cable assembly of FIG. 1, wherein a part of the second intermediate assembly enclosed by dashed line is enlarged and illustrated.

Referring to FIGS. 1, 7 and 8, the cable assembly 10 of the present embodiment is formed via three steps comprising a cable holding step, a cable fabrication step and a contact attachment step. Hereafter, explanation will be made about an example of each step.

Referring to FIG. 7, in the cable holding step, a die (not shown) is used to mold resin into the holding member 40. In this molding, the cables 20 are insert-molded while opposite ends of each of the cables 20 are held by a clamp member (not shown). In this molding, the die is used to form the press-fit holes 52 and 54 (see FIG. 8).

As a result of the cable holding step, a first intermediate assembly 12 is formed. The holding member 40 of the first intermediate assembly 12 has an upper end surface 44. The upper end surface 44 is a flat surface which extends in parallel to the horizontal plane and defines an upper end of the holding member 40 of the first intermediate assembly 12. In the first intermediate assembly 12, each of the cables 20 has the one held portion 32 and two of the extending portions 34. For each of the cables 20, one of the extending portions 34 extends rearward from the predetermined side surface 48, and a remaining one of the extending portions 34 extends upward and forward from the upper end surface 44.

Referring to FIG. 8 together with FIG. 7, in the cable fabrication step, an upper end part of the holding member 40 including the upper end surface 44 is shaved along the horizontal plane, and the extending portions 34, which extend upward and forward from the upper end surface 44, are cut out. As a result, a second intermediate assembly 14 is formed. As a result of shaving the upper end surface 44, the second intermediate assembly 14 is formed with the predetermined surface 42. As a result of cutting out the extending portions 34, the fixed portions 38 of the conductive wires 22 are formed. The thus-formed fixed portions 38 are flush with the predetermined surface 42. Moreover, the covers 24 each enclosing the fixed portion 38 are flush with the predetermined surface 42.

Referring to FIG. 1 together with FIG. 8, in the contact attachment step, the contacts 60 are attached to the predetermined surface 42 from above. In detail, the press-fit portions 64 and 66 of each of the contacts 60 are press-fit into the corresponding press-fit holes 52 and 54, respectively. Then, each of the contacts 60 is fixed to the fixed portion 38 of the corresponding conductive wire 22 by a fixation method such as soldering or welding.

According to the present embodiment, the conductive wires 22 can be attached to the contacts 60, respectively, without performing an existing cumbersome step in which the covers 24 of opposite ends of each of the cables 20 are accurately removed, for example. In addition, the contact attachment step can be easily performed since each of the fixed portions 38 of a planar shape is connected to the predetermined surface 42 of a planar shape.

The aforementioned forming method can be variously modified as necessary. For example, in the cable fabrication step, only the extending portions 34 (see FIG. 7), which extend upward and forward from the predetermined surface 42, may be cut out without shaving the holding member 40. Moreover, the press-fit holes 52 and 54 may be formed after the cable fabrication step has ended.

Referring to FIG. 1, as previously described, each of the held portions 32 of the present embodiment linearly extends from the predetermined side surface 48 to the predetermined surface 42 along the predetermined direction oblique to the upper-lower direction. Referring to FIGS. 1, 7 and 8, according to this structure, each of the extending portions 34 (see FIG. 7), which extends from the predetermined surface 42, is obliquely cut relative to the predetermined direction in which each of the held portions 32 extends. As a result, the fixed portion 38 of the conductive wire 22 has a size, namely a first area, in the horizontal plane while the conductive wire 22 has another size, namely a second area, in a plane perpendicular to a direction along which the cable 20 extends. The first area is larger than the second area.

According to the present embodiment, since the first area is larger than the second area, the facing surface 72 of the contact 60 can be easily and securely fixed to the fixed portion 38. However, the present invention is not limited thereto. The direction in which the held portion 32 extends is not specifically limited, provided that the first area of the fixed portion 38 in the horizontal plane can be made larger than the second area of the conductive wire 22 in a plane perpendicular to a direction in which the cable 20 extends. Hereafter, this area of the conductive wire 22 is referred to as "cross-sectional area of the conductive wire 22". For example, each of the held portions 32 may partially extend in parallel to the front-rear direction. Moreover, in an instance where the cross-sectional area of each of the conductive wires 22 is sufficiently large, each of the held portions 32 may linearly extend from a lower surface of the holding member 40 to the predetermined surface 42 along the upper-lower direction.

Referring to FIG. 1, the size of each of the fixed portions 38 in the horizontal plane of the present embodiment is larger than the size of the passing hole 74 in the horizontal plane. Each of the fixed portions 38 is covered by the facing surface 72 except for a part thereof which is located under the passing hole 74. However, the present invention is not limited thereto. For example, each of the fixed portions 38 may be partially located outward of the facing surface 72 in the horizontal plane. However, the present embodiment is preferable from a viewpoint of reduction of an exposed area of the conductive wire 22.

Referring to FIG. 8, when the cable fabrication step ends, the position of the fixed portion 38 of each of the conductive wires 22 is equal to the position of the predetermined surface 42 in the upper-lower direction. Moreover, the position of each of the covers 24 which encloses the fixed portion 38 is equal to the position of the predetermined surface 42 in the upper-lower direction. Referring to FIG. 2, As a result, the facing surface 72 of each of the contacts 60, which is attached to the predetermined surface 42, is in contact with the cover 24 in the upper-lower direction. However, the present invention is not limited thereto. For example, each of the covers 24 may shrink downward or may expand upward as time goes on. When the cover 24 shrinks downward, an upper end of the cover 24 will be located under the predetermined surface 42 and the facing surface 72. When the cover 24 expands upward, the upper end of the cover 24 will be pressed against the facing surface 72.

The cable assembly 10 of the present embodiment can be further variously modified in addition to the already described modifications. Hereafter explanation will be made about two modifications of the cable assembly 10. Each of the modifications described below can be variously modified similarly to the already described embodiment.

Figure 9:
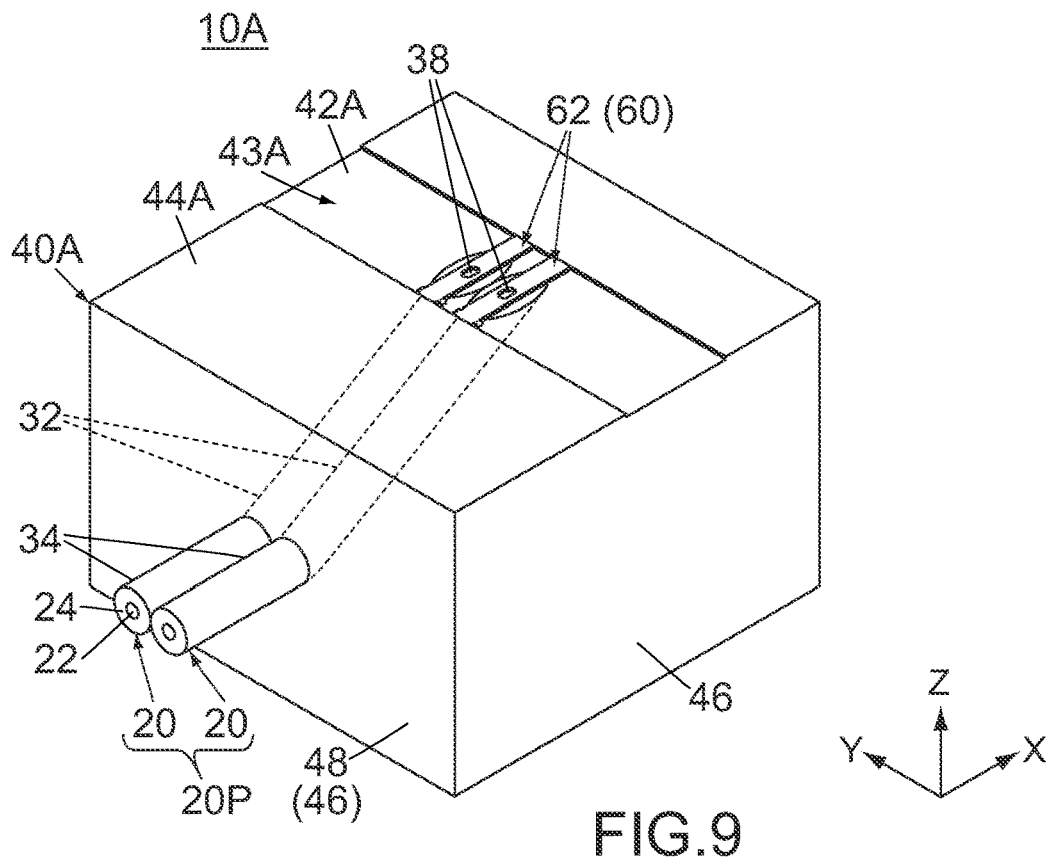
FIG. 9 is a perspective view showing a first modification of the cable assembly of FIG. 1, wherein outlines of the held portions of the cables embedded in the holding member are illustrated with dashed line.

Comparing FIG. 9 with FIG. 1, a cable assembly 10A of a first modification comprises the two cables 20 and the two contacts 60 same as those of the cable assembly 10 and comprises a holding member 40A different from that of the cable assembly 10. The holding member 40A has a predetermined surface 42A and an upper end surface 44A instead of the predetermined surface 42. The holding member 40A has a structure same as that of the holding member 40 except for this difference. The cable assembly 10A can be formed by a forming method similar to that of the cable assembly 10.

Referring to FIG. 9, the upper end surface 44A defines an upper end of the holding member 40A. The upper end surface 44A is formed with a recessed portion 43A. The recessed portion 43A is a recess which is recessed downward from the upper end surface 44A. The recessed portion 43A has a constant width, or a constant size in the front-rear direction, and extends over the holding member 40A in the lateral direction. The recessed portion 43A has a width which is same as a size of each of the contacts 60 in the front-rear direction. The thus-shaped recessed portion 43A can be formed by partially shaving the upper end surface 44A in the aforementioned cable fabrication step. The predetermined surface 42A of the present modification is a bottom surface of the recessed portion 43A. Thus, the predetermined surface 42A is located below the upper end surface 44A. The recessed portion 43A has a height, or a size in the upper-lower direction, which is same as a thickness, or a size in the upper-lower direction, of the body 62 of each of the contacts 60.

The contacts 60 are located above the holding member 40A. The contacts 60 of the present modification are received in the recessed portion 43A of the holding member 40A. The facing surface 72 (see FIG. 4) of each of the contacts 60 is in contact with the predetermined surface 42A of the holding member 40A or faces the predetermined surface 42A with a distance formed therebetween in the upper-lower direction. The fixed portion 38 of each of the conductive wires 22 is fixed and connected to the facing surface 72. According to the present modification, each of the contacts 60 can be made so that the position of the upper surface thereof in the upper-lower direction is equal to the position of the upper end surface 44A in the upper-lower direction. In addition, the upper surface of each of the contacts 60 can be arranged so as to extend to the upper end surface 44A with no substantial gap.

According to the present modification, the mating contacts (not shown) each having a spring portion can be smoothly moved to the upper surfaces of the contacts 60 along the upper end surface 44A, respectively. Moreover, according to the present modification, each of the contacts 60 can be partially press-fit into the recessed portion 43A so as to be sandwiched and held by two walls of the recessed portion 43A, and thereby the contacts 60 can be more securely fixed to the holding member 40A. Moreover, the contacts 60 of the present modification may be sandwiched and held by the two walls of the recessed portion 43A while none of the press-fit portions 64 and 66 is provided. Thus, each of the contacts 60 of the present modification may be a single metal plate with no bend. In this instance, the manufacturing cost of the contacts 60 can be reduced.

Figure 10:
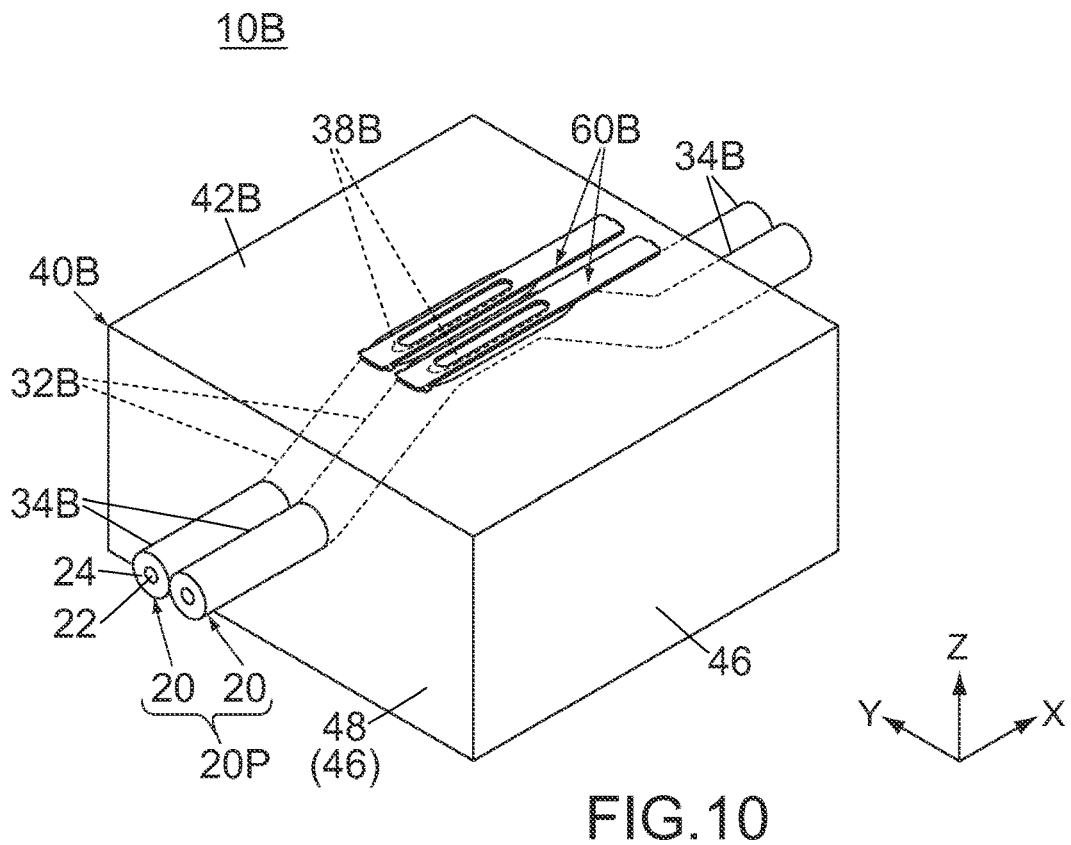
FIG. 10 is a perspective view showing a second modification of the cable assembly of FIG. 1, wherein outlines of the held portions of the cables embedded in the holding member and hidden outlines of the fixed portions of the cables are illustrated with dashed line.
Figure 11:
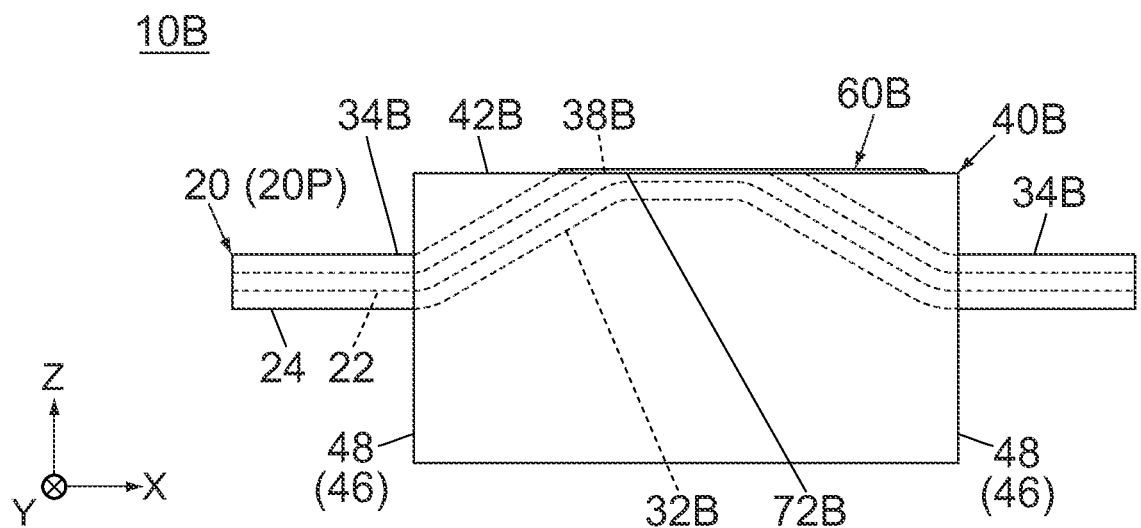
FIG. 11 is a side view showing the cable assembly of FIG. 10, wherein an outline of the held portion of the cable embedded in the holding member and an outline of a hidden conductive wire of the cable are illustrated with dashed line.

Comparing FIGS. 10 and 11 with FIG. 1, a cable assembly 10B of a second modification comprises a holding member 40B and two contacts 60B different from those of the cable assembly 10. The cable assembly 10B comprises the two cables 20 same as those of the cable assembly 10. However, each of the cables 20 of the present modification is fabricated in such a way different from that of the cable assembly 10. More specifically, each of the cables 20 of the present modification has a held portion 32B, two extending portions 34B and a fixed portion 38B different from those of the cable 20 of the cable assembly 10. The cable assembly 10B can be formed by a forming method similar to that of the cable assembly 10.

The holding member 40B has a predetermined surface (upper end surface) 42B. The predetermined surface 42B is a flat surface which extends in parallel to the horizontal plane similarly to the predetermined surface 42 and defines an upper end of the holding member 40B. The conductive wire 22 of each of the cables 20 has an exposed portion, namely a fixed portion 38B. Each of the fixed portions 38B has a shape and a size in the predetermined surface 42B different from those of the fixed portion 38. Moreover, the holding member 40B has two of the predetermined side surfaces 48. One of the predetermined side surfaces 48 is a rear surface of the holding member 40B. A remaining one of the predetermined side surfaces 48 is a front surface of the holding member 40B. The holding member 40B has a structure similar to that of the holding member 40 except for the aforementioned differences.

The held portion 32B of each of the cables 20 of the present modification linearly extends from the predetermined side surface 48, which is the front surface, to the predetermined surface 42B along the predetermined direction oblique to the upper-lower direction. Thereafter, each of the held portions 32B extends forward along the front-rear direction. Thereafter, each of the held portions 32B linearly extends to the predetermined side surface 48, which is the rear surface, along a direction oblique to the upper-lower direction. One of the extending portions 34B of each of the cables 20 of the present modification is arranged outside the holding member 40B and extends rearward from one of the predetermined side surfaces 48 which is the rear surface. A remaining one of the extending portions 34B is arranged outside the holding member 40B and extends forward from a remaining one of the predetermined side surfaces 48 which is the front surface.

The fixed portion 38B of each of the cables 20 of the present modification is formed by cutting out a part of the held portion 32B, which extends along the front-rear direction, along the horizontal plane in the aforementioned cable fabrication step. According to the present modification, the size of the fixed portion 38B can be further made large.

Figure 12:
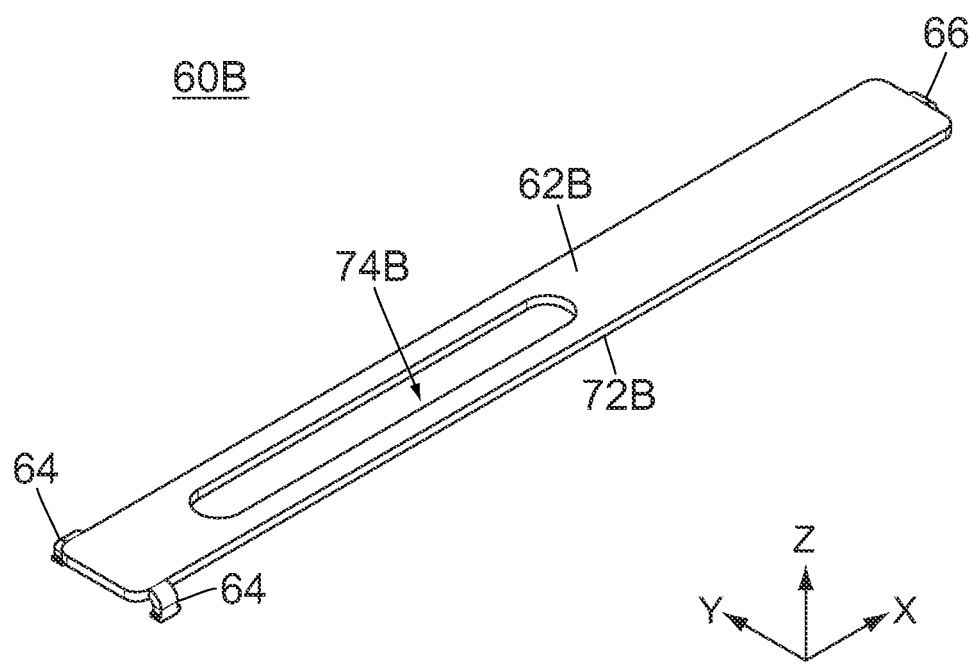
FIG. 12 is a perspective view showing a contact of the cable assembly of FIG. 10.

Comparing FIG. 12 with FIG. 3, each of the contacts 60B has a body 62B and a facing surface 72B different from those of the contact 60. Each of the contacts 60B is formed with a passing hole 74B different from that of the contact 60. The body 62B has a size in the front-rear direction which is larger than another size of the body 62 in the front-rear direction. Therefore, the facing surface 72B has a size larger than another size of the facing surface 72 in the front-rear direction. Moreover, the passing hole 74B has a size larger than another size of the passing hole 74 in the front-rear direction. Each of the contacts 60B has a structure similar to that of the contact 60 except for the aforementioned differences. For example, each of the contacts 60B has the two press-fit portions 64 and the one press-fit portion 66 same as those of the contact 60.

Referring to FIGS. 10 and 11, the contacts 60B are located above the holding member 40B. The facing surface 72B of each of the contacts 60B is in contact with the predetermined surface 42B of the holding member 40B or faces the predetermined surface 42B with a distance formed therebetween in the upper-lower direction. The fixed portion 38B of each of the conductive wires 22 is fixed and connected to the facing surface 72B. According to the present modification, the cables 20 can connect two electronic devices (not shown) with each other, and the middle of each of the cables 20 can be connected to the contact 60B.

As shown in FIG. 12, the passing hole 74B of each of the contacts 60B has a long track-like shape in the horizontal plane and has a large size. Referring to FIG. 10 together with FIG. 12, the fixed portion 38B of each of the conductive wires 22 of the present modification is securely fixed and connected to the facing surface 72B of the contact 60B by solder put into the large passing hole 74B. However, the present invention is not limited thereto. For example, each of the contacts 60B may be formed with a plurality of passing holes (not shown) instead of the passing hole 74B. Each of these passing holes may have a circular shape. Moreover, each of the contacts 60B may be formed with none of the passing hole 74B, and each of the fixed portions 38B may be fixed and connected to the facing surface 72B via welding such as laser beam welding.

What is claimed is:

1. A cable assembly comprising a cable, a holding member, and a contact, wherein:
   the holding member holds the cable;
   the contact is located above the holding member in an upper-lower direction;
   the cable comprises a conductive wire;
   the conductive wire has a fixed portion;
   the holding member has a predetermined surface;
   the contact has a facing surface;
   the facing surface is in contact with the predetermined surface in the upper-lower direction;
   the fixed portion is fixed and connected to the facing surface;
   the fixed portion has a first area in a plane perpendicular to the upper-lower direction;
   the conductive wire has a second area in a plane perpendicular to a direction along which the cable extends; and
   the first area is larger than the second area.

2. The cable assembly as recited in claim 1, wherein the contact is fixed to the holding member.

3. The cable assembly as recited in claim 1, wherein the cable is insert-molded in the holding member.

4. The cable assembly as recited in claim 1, wherein the holding member is made of an insulator.

5. The cable assembly as recited in claim 1, wherein the contact is formed of a metal plate.

6. A cable assembly comprising a cable, a holding member, and a contact, wherein:
   the holding member holds the cable;
   the contact is located above the holding member in an upper-lower direction;
   the cable comprises a conductive wire;
   the conductive wire has a fixed portion;
   the holding member has a predetermined surface;
   the contact has a facing surface;
   the facing surface is in contact with the predetermined surface in the upper-lower direction;
   the fixed portion is fixed and connected to the facing surface;
   a passing hole is formed in the contact;
   the passing hole passes through the facing surface in the upper-lower direction;
   a position of the fixed portion of the conductive wire in a horizontal plane perpendicular to the upper-lower direction is equal to or overlaps with another position of the passing hole in the horizontal plane; and
   the fixed portion is soldered to the facing surface.

7. A cable assembly comprising a cable, a holding member, and a contact, wherein:
   the holding member holds the cable;
   the contact is located above the holding member in an upper-lower direction;

the cable comprises a conductive wire;
the conductive wire has a fixed portion;
the holding member has a predetermined surface;
the contact has a facing surface;
the facing surface is in contact with the predetermined surface in the upper-lower direction;
the fixed portion is fixed and connected to the facing surface;
the contact is provided with a projection;
the projection projects downward from the facing surface; and
the fixed portion is welded to the projection.

8. A cable assembly comprising a cable, a holding member, and a contact, wherein:
the holding member holds the cable;
the contact is located above the holding member in an upper-lower direction;
the cable comprises a conductive wire;
the conductive wire has a fixed portion;
the holding member has a predetermined surface;
the contact has a facing surface;
the facing surface is in contact with the predetermined surface in the upper-lower direction;
the fixed portion is fixed and connected to the facing surface;
the cable comprises a cover which covers the conductive wire; and
the facing surface is in contact with the cover in the upper-lower direction.

* * * * *